May 15, 1962
F. A. GUNN ET AL
3,034,859
DELAMINATED ENGLISH CLAY PRODUCTS, ETC.
Filed April 27, 1959
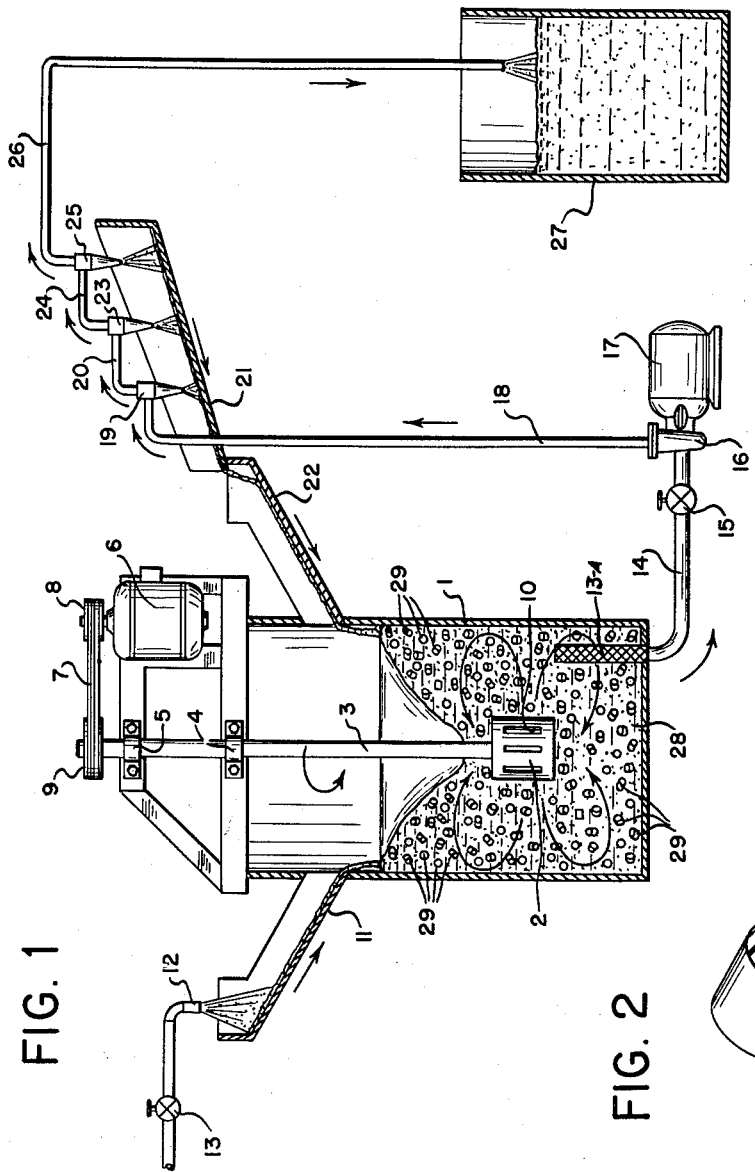
INVENTORS
FRED A. GUNN
HORTON H. MORRIS
BY
ATTORNEYS 3,034,859
DELAMINATED ENGLISH CLAY
PRODUCTS, ETC.
Fred A. Gunn, Gordon, and Horton H. Morris, Macon, Ga., assignors to Southern Clays, Inc., New York, N.Y., a corporation of Georgia
Filed Apr. 27, 1959, Ser. No. 809,164
8 Claims. (Cl. 23—110)

This invention relates to improvements in the treatment of English primary filler clays and English primary coating clays for the production of improved products therefrom; and includes the new clay products and an improved process of producing them.

More particularly, the invention relates to an improved process for converting cheap English primary filler clays into products equivalent to or better than the present No. 2 English primary coating clays, and which approach or exceed in some properties the finest available English primary coating clays; and also an improved process for treating English primary coating clays to produce therefrom improved coating clays.

English filler clays and English coating clays are primary filler clays and primary coating clays imported from England, and are commonly referred to and identified as English filler clays and English coating clays. These primary imported English clays will be hereafter referred to as English filling clays or English coating clays with the understanding that the clays are primary imported clays.

The improved process of the present invention is a delamination process in which the English filling clay or the English coating clay is subjected, under conditions protecting it from contamination by abrasion, to a fine milling mechanical action which can be visualized as being a combination of (1) mild viscous shear milling due to agitation of the viscous mass composed of fine milling media, water and clay; (2) mild percussive milling due to the multiplicity of low inertia impacts offered by the collisions of the fine milling media with itself and with the clay; and (3) mild frictional milling produced by the combination of rubbing action of the fine media to itself and of the fine media to the clay.

These three actions occur simultaneously and are mutually cumulative in effectiveness in bringing about delamination of the clay booklets or aggregates and the production therefrom of improved delaminated clay products. Care should be taken to protect the clay during milling from contamination by abrasion or otherwise.

We have found that the desired delamination can be advantageously effected by the use of non-abrasive grinding media, such as beads or pellets of nylon, styrene-divinyl benzene copolymer, or other plastic material, acting as a fine milling medium.

The delamination of the coarse British filler clay, while in suspension in water and under the action of the fine milling media, is continued until the coarse clay particles are delaminated and converted into a product which is directly of the desired size, e.g. for use as a coating clay, or of a size which, after further classification, can be so used.

The process of delamination can be carried out as a batch process or as a continuous process, with regulation and with continuation of the delamination until the clay has been delaminated to the desired extent. Thus in the batch operation, the clay in a dispersed condition in an equal weight of water can be admixed with nylon pellets of about 1/10 inch in diameter and 1/10 inch long, and of a weight of about 5 parts of nylon for 3 parts of the coarse clay, and subjected to the combined shear, percussive and frictional milling by a vigorous agitation of the suspension of coarse clay and nylon, and continuing the process until the desired delamination of the clay particles has taken place.

The process of delaminating the clay is advantageously carried out in a continuous manner with the use of the fine milling media, such as small balls, cylinders, beads or pellets of nylon, styrene-divinyl benzene copolymer, polyethylene or other plastic, acting upon a suspension of the coarse clay in water. In the continuous delamination, the clay is fed continuously into the delaminating apparatus and the discharge from the apparatus is advantageously combined with a fractionation of the clay to return the coarser clay to the apparatus while removing only the finer clay of the desired particle size. This selective takeoff of the finer clay, while returning the coarser clay to the vessel in which the delamination is taking place, has the advantage that the finer clay that may be admixed with the coarse clay fed to the apparatus is continuously being removed at the same time that the fine clay produced by the delamination is being removed, so that the clay remaining in the apparatus during the continued operation is made up mainly of the coarser clay particles which are undergoing delamination and which are being continuously freed from finer clay particles by the selective drawoff and fractionation and return of coarser clay particles.

This continuous drawoff of clay suspension, separation of finer clay and return of coarser clay to the apparatus is also advantageously continuous and can be accomplished by subjecting the withdrawn clay to a centrifugal separation with return of the coarser clay to the apparatus, or by the use of one or more cyclone separators which will separate the finer clay fraction and return the coarser clay to the apparatus.

The use of a fine grinding media such as nylon or other plastic has the advantage that objectionable abrasion of the apparatus is avoided, so that steel apparatus can be used without objectionable contamination of the clay.

In the batch-wise or continuous operation of the process, the delaminating is effected by a rapid agitation or flow of the fine grinding media, e.g., nylon, with the clay in suspension, to accomplish the combined shear, percussive and frictional milling action above referred to.

English filler clays have G.E. brightness values in the range of 80–85 and vary in particle size from about 35% to perhaps 60% below two microns. They may occasionally be used to coat paper-board or paper, but their relative coarseness causes low gloss and poor opacity, while their relatively low brightness limits the brightness obtainable on the coated board or paper.

For these and other reasons, the filler clays command only a low price (e.g. $12.00–$15.00 per ton) and their poor coating properties limit the markets to which they can be sold.

Crude clay or filler clay may be particle sized to grades containing 80%–100% of particles below 2 microns in size and the fine fractions so obtained will have many excellent coating properties and can command relatively high prices ($30.00–$90.00 per ton), depending on the degree of fineness. The coarse clay that is of necessity formed during the operation (35–60 or more percent, depending on the starting material) has even poorer qualities than the filler grades, making sales still more difficult.

The English coating clays produced by the operation mentioned above have many excellent paper coating properties. Their G.E. brightness is usually above 90 (the best American grades do not exceed 88), which allows the formation of high brightness coated sheets. Their fine particle size distribution allows high gloss sheets to be produced (the degree depending on the fineness) and also allows the formation of more opaque coatings. Their two most serious drawbacks are high adhesive demand and their relatively poor rheological characteristics which limit their use primarily to off-machine coating operations.

The high adhesive demand makes the use of English coating clays more costly and, in addition, is detrimental to coated sheet properties, since the additional adhesive tends to reduce the gloss and brightness of the coated sheet.

Many of the present day paper coating operations are run on the paper making machine, and the very high speeds at which the machines operate make essential the use of a coating mixture that will flow into the paper smoothly at very high solids content, since the removal of extra water can be handled only by slowing down the machine or by adding extra drying capacity, both very expensive alternatives. The poor flow properties of high solids content English coating clay slurries mitigate against their use in this type of operation, thus severely limiting their potential market.

Although the opacity obtained on a coated sheet from the use of English coating clay is good, any improvement in this respect is of importance, since improved opacity obtained from the pigment in the coating would allow the production of a lighter sheet and, therefore, a lower mailing charge. In other operations, the ability to obtain a given opacity level through the use of less pigment is of importance.

The following table lists some properties of paper sheets coated with two English coating clays that differ primarily in particle size. The effect of particle size difference in determining the properties and the value placed on the differences in the properties should be noted.

| | Selling Price Per Ton | Calendered Sheet Properties | | | |
|---|---|---|---|---|---|
| | | Gloss | Opacity | Brightness | Adhesive Demand, Dennison Wax Pick |
| Star Clay (80–85% of particles are below 2 microns) | $32 | 42.5 | 93.5 | 80.5 | #7 |
| Supreme Clay (95–100% of particles are below 2 microns) | $85–90 | 63.0 | 94.4 | 81.8 | #6 |

With the foregoing in mind, we have found a method of (1) converting cheap English filler clays in 90–100% yield into products equivalent to, or better than, the present #2 English coating clay and which approach or exceed in some properties the finest available English coating clay; and (2) a method which can produce from English coating clays a coating pigment not heretofore obtainable.

The coating product or products that can be obtained from English filler clay through delamination are remarkable in that unexpectedly high glossing properties are obtained. In the present art, the gloss to be obtained from a clay is considered to be a direct function of particle fineness. Especially the percentage of particles below two microns in a given coating clay is considered the governing factor in the gloss obtainable on a coated sheet. Thus, the Star English coating clay mentioned earlier contained 84.5% of its particles below two microns in size and gave a calendered gloss of 42.5, while the Supreme English clay, which had 96.2% of its particles below two microns in size, gave a gloss of 63.0, a difference which, along with somewhat better opacity and sheet brightness (both to some extent a function of finer particle size also) allows a price differential of some $55.00 per ton to be obtained.

It is of particular interest to note that the product from Example #1 imparted a gloss of 55 to a calendered sheet, although only 66% of its particles were below two microns, while the product from Example #2, which had the same particle size distribution of Star clay (84.5% of particles below two microns) gave a gloss value of 61.5 which virtually matches that obtained from the #1 English coating clay (Supreme).

In addition, the unusually high opacity obtained from the delaminated products is of interest, while their improved adhesive demand and their improved rheological properties make them far superior to the present English coating clays. In fact, they are opening up the machine coating field to English clays for the first time.

Subjecting the new products or coating mixtures containing the new products to high shear milling (milling a 70–85% solids slurry or mass in, for example, a sigma-blade type kneader), a common procedure in paper mills which practice on-machine coating operations, gives a still greater reduction in viscosity of the product for use with on-machine coating, and should permit the production of unusually high quality machine coated board and paper.

English coating clays, when subjected to the delamination procedure, show only a small increase in fineness of particle size, but their coating properties are dramatically improved, giving values not heretofore obtainable. Thus the delamination of Star clay produces a product which gives 17.5 points better gloss, 1 point better brightness and 2.5 points better opacity on a coated, calendered sheet. Of even greater importance, the product has much improved viscosity characteristics so that its use in machine coating is possible. The product also shows a reduced adhesive demand.

Supreme clay is probably the best available coating clay insofar as optical (brightness, gloss, color) coated sheet properties are concerned. It is particularly noteworthy, that the product obtained when this clay is delaminated allows the formation of coated sheets with better gloss (3 points), better brightness (about 1 point) and better opacity (almost 2 points). In particular, the product has a much improved adhesive demand and viscosity characteristics, making the product suitable for machine coating operations. As mentioned earlier, the relatively poor viscosity and high adhesive demand of supreme clay have been the principal objection to this material.

In summary, then, English filler clays may be converted by delamination into products that are equal to or better than the present English coating clays (i.e. they give excellent gloss, brightness, opacity, viscosity and adhesive demand values when used in coating compositions), while English coating clays can be converted into coating products which have properties not heretofore obtainable. The filler clays also can be converted into the very highest grade products of the type obtained by delaminating coating clays, if sufficient time and energy are used.

The products differ from the starting materials or from conventional clays in their thickness to breadth ratio, the delaminated product being thinner and, to a minor extent, in the percent of non-clay impurities—the delaminated products having a somewhat lower percentage of iron and titanium containing impurities (see Example 3).

The results obtained upon calcination also indicate that a difference exists between delaminated and non-delaminated clays. Delaminated clays show, after calcination, a higher brightness and a lower abrasion than would normally be expected on the basis of particle size distribution.

The various properties of the several clays and delaminated products mentioned earlier as well as the methods of treatment are given in the following examples and tables.

The invention will be further described in connection with the accompanying drawing, which illustrates, in a somewhat conventional and diagrammatic manner, an apparatus for carrying out the process of the invention and for producing the new delaminated clay products of the invention.

In the drawings,

FIG. 1 shows the apparatus in vertical section; and

FIG. 2 illustrates on an enlarged scale one of the fine grinding elements.

The apparatus illustrated is made up of a tank or vessel 1 having a rotating agitator 2 therein mounted on the shaft 3 which is supported by bearings 4 and 5 and rotated by the motor 6 and the belt 7, which passes over a pulley 8 on the motor and a pulley 9 on the shaft. The agitator 10 is cylindrical in shape of e.g. 6 inches diameter and 6 inches high and with six slots ⅜ inch in width around the cylinder.

The feed of the clay suspension containing e.g., equal proportions of water and clay, is through the inlet trough 11 from the pipe 12 having flow regulating valve 13 therein.

The outlet from the tank 1 is through an outlet 13-A covered with 60-mesh screen and through the line 14 to the pump 16 operated by motor 17 and which discharges the clay suspension through the line 18 into the first of a series of three cyclones 19, in which separation of coarser and finer clay particles takes place, with the coarser clay flowing back to the trough 21 and the finer clay passing through the line 20 to the second cyclone 23, where a similar action takes place, with the finer clay passing through the line 24 to the third cyclone 25, from which the coarser clay is returned to the trough 21 and the finer clay passes through the line 26 to the receptacle or tank 27. The coarser clay fractions separated in the cyclones return through the troughs 21 and 22 to the vessel 1.

The fine grinding media illustrated is in the form of cylinders of nylon $\frac{1}{10}$ inch in diameter and $\frac{1}{10}$ inch long, one of which is shown magnified in FIG. 2. Only a few of these nylon cylinders are shown in the tank 1, and their size is somewhat exaggerated, but it will be understood that in practice the entire tank will be filled with these to an extent such that during the rapid agitation of the admixture of the clay suspension and the nylon elements, there will be continuous and intimate delaminating action by the combined shear, percussive and frictional milling above referred to. For example, 5 parts by weight of the nylon pellets and 6 parts by weight of a 50/50 clay-water suspension or slurry is illustrative of the relative amount of the fine delaminating elements and of the clay subjected to their action.

The tank 1 can be lined with polyethylene or other material, but it is one advantage of the use of the non-abrasive fine grinding media such as nylon that a steel apparatus can be used.

In the operation of the process and with an apparatus such as illustrated, and an agitator of the size described, the agitator will be rotated at a rapid rate, e.g., around 1750 r.p.m., with resulting rapid and intense movement and action of the combined character above referred to, involving shear milling, percussive milling, and frictional milling to bring about the desired delamination of the coarse clay particles.

The apparatus illustrated can be operated as a batch apparatus with the charge of the clay introduced together with the nylon elements and with rapid agitation and resulting delaminating action until the coarse clay has been converted into the desired fine clay particles.

The apparatus can advantageously be operated as a continuous apparatus with continuous feed of the clay suspension in regulated amount through the trough 11 and with continuous removal of clay through the screen outlet and separation of the finer desired clay through the multi-stage cyclones, while returning the coarser clay particles for further delamination.

This continuous method of operation has the advantage that small amounts of fine clay entering the apparatus with the coarse clay are continuously removed along with the fine clay from the delaminating treatment, while the coarser clay particles are continuously subjected to delamination with the minimum amount of the finer clay particles in admixture therewith.

The fine clay resulting from the delaminating treatment, and of a particle size suitable for coating clay, is further subjected to a bleaching treatment such as is commonly used in bleaching present-day coating clays.

Where the new coating clay product is to be further treated by calcining to produce a calcined product, the clay will be dried and pulverized before it is calcined and the calcining can be carried out in calcining furnaces with proper temperature control, as hereinafter described, followed by e.g. a pulverizing of the calcined product to break up aggregates formed during the calcination.

The invention will be further illustrated by the following specific examples, but it will be understood that the invention is not limited thereto.

The first three examples relate to the delamination of English filler clay for the production of improved products therefrom. Examples 4 and 5 illustrate the delamination of English coating clays to produce improved products therefrom.

TREATMENT OF ENGLISH FILLER CLAYS

Example 1

This example illustrates the carrying out of the process on a laboratory scale. The clay used as the starting material was an English filler clay sold in this country (Moore & Munger, 33 Rector Street, New York 6, New York), which had a particle size distribution (expressed in equivalent spherical diameter) as determined by the sedimentation method described in the TAPPI publication T649 sm–54 of 18.5% above 5 microns, 58.5% below two microns and 45.5% below 1 micron. The clay had a G.E. brightness of 85.2 and an uncalendered sheet coated with this clay had a B & L gloss of 4.0, a G.E. brightness of 78.8 and a Dennison wax pick on No. 7 wax.

A dispersed clay-water slurry was made of 1000 grams of the filler clay, 1500 grams of water to give a suspension of 40% solids, and 3 grams or 0.3% of the dry weight of the clay of tetrasodium pyrophosphate. The slurry was placed in a one gallon polyethylene jar, together with 1667 grams of nylon pellets of $\frac{1}{10}$ inch length, obtained from the National Aniline Div. of Allied Chemical & Dye Corporation. The container was sealed and then shaken for 5 hours by the use of an oscillating "Red Devil" paint conditioner which operated at about 1100 cycles per minute. This apparatus is marketed by Red Devil Tool, Union, New Jersey.

At the end of this period, the nylon was removed from the slurry by means of a coarse screen. The slurry was diluted somewhat and poured through a 325 mesh screen. The pH of the slurry was then adjusted to pH 4–5 by the addition of sulfuric acid and the clay product recovered by filtration.

The unbleached sample was then dried and pulverized and was found to have a G.E. brightness of 88.9 and an excellent white color. A small portion of the product was bleached before filtration by the addition of 0.0025 g. of sodium hydrosulfite (sodium hyposulfite) per gram of dry clay and the dried, pulverized product had a brightness of 90.3. In particle size, the product contained 7.0% above 5 microns, 66% below 2 microns and 52% below 1 micron.

A sheet coated with the (unbleached) product had an uncalendered gloss of 8.0, a G.E. brightness of 81.6 and gave a Dennison wax pick on No. 11 wax. For comparison, an English coating clay (Star clay), presently being sold to the paper industry showed a gloss on a coated, uncalendered sheet, made under strictly comparable conditions, of 6.0 (even though its particle size distribution of 2% above 5 microns, 84.5% below 2 microns and 67.5 below 1 micron would lead one to expect a higher gloss than the coarser product), a brightness of 82.3 and a Dennison wax pick on No. 7 wax.

The product shows an improvement in brightness and the finer particle size, as compared to the starting material. The high gloss obtained with this product, as compared to that obtained with the English coating clay becomes of even greater importance when it is realized that addition of adhesive to the standard coating clay to give a comparable wax pick would have given a still lower gloss value and a lowered sheet brightness. Also the product was not bleached nor was it of the same degree of fineness as the English coating clay used for comparison.

The results obtained after calendering the above sheets are shown in Table I.

In addition to the marked advantages in calendered gloss and in adhesive demand shown by the product over English coating clay, special emphasis should be placed on the marked improvement in opacity (2.3 points) shown by the delaminated product over the coating clay.

The unbleached, pulverized product was calcined for one hour at 1860 degrees F. in a laboratory type Lindberg electric furnace and was then repulverized. The calcined material had a G.E. brightness of 92.4 and an abrasion of 294 mg. For comparison, the above mentioned English coating clay, when calcined as described, had a G.E. brightness of 92.5 and an abrasion of 320 mg. Since a coarser particle size of the calciner feed causes higher abrasion, the relatively low abrasion of the calcined product is of interest.

Various modifications in the process can be made. Thus the use of plastics other than nylon (e.g. styrene divinylbenzene copolymers, polyethylene, Teflon, etc.) that have satisfactory properties; modifications in the size of milling media ($\frac{1}{32}$ inch diameter media is even more satisfactory than the $\frac{1}{10}$ inch diameter size); dispersing agents other than tetrasodium pyrophosphate can be used (calgon, the various condensed alkali polyphosphates, alkali silicates, etc.); and other bleaching agents (e.g. zinc hydrosulfite) can be used. The process can be further modified to remove sand and other coarse discoloring impurities that are freed during the treatment by sedimenting or centrifuging the sample.

The process may also be run as a continuous operation as described in Example 3.

*Example 2*

Another run was made in a manner similar to that described in Example 1, except that a coarser English filler clay was used as the starting material. The clay had a particle size distribution of 28% above 5 microns, 46% below 2 microns and 36.5% below 1 micron (equivalent spherical diameter) and had a G.E. brightness of 80.5. An uncalendered sheet coated with this product had a gloss of 4.0 and a G.E. brightness of 75.1.

The mixture, after being shaken 5 hours, was screened as described previously and was then diluted to 17% solids and allowed to settle one half hour per inch of depth to remove sand and coarse discoloring impurities. At the end of this time the slurry or slip was carefully removed from the settled coarse material and was then acidified, bleached by the addition of 0.908 gram of sodium hydrosulfite per pound of dry clay, filtered, dried and pulverized.

The particle size of the product so produced contained no particles above 5 microns, 84.5% below 2 microns and 66.2% below 1 micron (equivalent spherical diameter). The product had a G.E. brightness of 90.0 and an excellent white color. The uncalendered gloss of a sheet coated with this material was 12.7, the G.E. brightness was 82.7 and the sheet showed a Dennison wax pick on No. 11 wax. The data should be compared to the results obtained with the English coating clay (Star clay) discussed in Example 1.

The data on the calendered sheet are summarized in Table I and show the unusually high gloss and opacity, as compared to a standard English coating clay. The marked reduction in adhesive demand over that of the English coating clay is of importance.

The product from Example 2, when calcined 1 hour at 1860 degrees F. in the Lindberg furnace (electrically heated), gave a calcined product having a G.E. brightness of 95.4 and an abrasion value of 147 mg. For comparison, an English coating clay (Starflow) having an uncalcined G.E. brightness of 91.0 and a particle size distribution of 2% over 5 microns, 81% below 2 microns and 68% below 1 micron gave, when calcined as described above, a calcined product having a G.E. brightness of 92.8 and an abrasion value of 463 mg. Data on the product obtained when another English coating clay (Star clay) was calcined are given in Example 1.

*Example 3*

This example illustrates a continuous process in which the English filler clay (particle size distribution in equivalent spherical diameter 34% above 5 microns, 38% below 2 microns and 26% below 1 micron and pigment G.E. brightness of 81.5) was dispersed in water at 21% solids using 0.4% tetrasodium pyrophosphate as the dispersing agent, biased on the weight of the clay, screened to remove trash, and then was mixed with nylon pellets of the type referred to in Example 1, to give an approximate weight ratio of 5 parts nylon pellets to 3 parts of clay, dry basis. An uncalendered sheet coated with the clay had a gloss of 3.5, a G.E. brightness of 74.2 and gave a Dennison wax pick on No. 8 wax.

The clay was delaminated in the apparatus shown in FIGURE 1 which permits removal of fines as they are formed and thus facilitates the delamination procedure, since delamination proceeds more rapidly when fewer fines are present. The classification unit also allows selection of the particular grade of product desired, graded on a particle size distribution basis.

When the apparatus was operated with continual withdrawal of a product containing 91.8% of its particles below 2 microns in equivalent spherical diameter, the product was found to have a G.E. brightness, after bleaching with sodium hydrosulfite, of 91.2, which is equivalent to that of standard English coating clays.

An uncalendered sheet coated with the product showed a G.E. brightness of 82.0, a gloss of 16.0 and gave a Dennison wax pick on No. 8 wax.

This product gave, after calcination for one hour at 1860 degrees F. in an electrically heated Lindberg laboratory furnace, a G.E. brightness of 93.6 and an abrasion value of 165.5 mg. For comparison, the English filler clay used as starting material gave, when calcined as above, a G.E. brightness of 84.2 and an abrasion value of 897 mg. The results obtained when standard English coating clays are calcined have been given previously.

Analysis of the starting material for Example 3, the product for Example 3 and the 16.5% of coarser material left when delamination was stopped are given below: (The percentage of "coarser material" could have been reduced by continuing the delamination procedure.)

|  | Percent $Fe_2O_3$ | Percent $TiO_2$ |
|---|---|---|
| Starting material for Example 3 | 0.946 | 0.137 |
| Product from Example 3 | 0.927 | 0.069 |
| Residue (16.5%) from the delamination operation | 1.04 | 0.224 |

A non-delaminated sample of the English filler clay was allowed to settle until 17% of sediment was obtained. Analysis on the English filler clay (non-delaminated), the sediment and the material which remained in suspension above the sediment ("tops") are given below:

|  | Percent Fe₂O₃ | Percent TiO₂ |
|---|---|---|
| English Filler Clay | 0.946 | 0.137 |
| "Tops" | 0.954 | 0.092 |
| Coarse | 0.971 | 0.175 |

It may be seen from the two sets of analysis that delamination allows the separation of some iron and titanium containing impurities that can not normally be removed from conventional clays.

TABLE I.—CALENDERED SHEET PROPERTIES
[Sheets calendered at a pressure of 1800 p.s.i.]

| Description | Gloss | Brightness | Opacity | Adhesive Demand, Dennison Wax Pick on Wax No. |
|---|---|---|---|---|
| Starting material for Example I English Filler Clay | 39.0 | 76.5 | 92.3 | 7 |
| Product from Example I (unbleached) | 55.0 | 78.8 | 95.8 | 10 |
| English Coating Clay (Star Clay) For Comparison | 42.5 | 80.5 | 93.5 | 7 |
| Starting material for Example II Another English Filler Clay | 35.5 | 72.4 | 95.4 | 11 |
| Product from Example II | 61.5 | 79.9 | 96.1 | 10 |

TREATMENT OF ENGLISH COATING CLAY

*Example 4*

This example also illustrates the carrying out of the process on a laboratory scale.

An English coating clay (Star clay) having a particle size distribution of 2% over 5 microns, 84.5% below 2 microns and 67.5% below 1 micron (expressed in equivalent spherical diameter and determined by TAPPI method T649 sm–54) was used as the starting material. The clay had a G.E. brightness of 89.8 and a sheet coated with the material had an uncalendered gloss of 6.0, a G.E. brightness of 82.3, and showed a Dennison wax pick on No. 7 wax.

A dispersed clay-water slurry was made of 1000 grams of this coating clay, 1500 grams of water to give a suspension of 40% solids, and 3 grams or 0.3% of the dry weight of the clay of tetrasodium pyrophosphate. The slurry was placed in a one gallon polyethylene jar, together with 1667 grams of nylon pellets of 1/10 inch diameter and 1/10 inch length, obtained from the National Aniline Division of Allied Chemical & Dye Corp. The container was sealed and then shaken for 5 hours by the use of an oscillating "Red Devil" paint conditioner which operated at about 1100 cycles per minute. This apparatus is marketed by Red Devil Tools, Union, New Jersey.

At the end of this period, the nylon was removed from the slurry by means of a coarse screen, and the slurry (diluted somewhat) was filtered through a 325 mesh screen to remove trash and traces of sand. The slurry was then acidified to pH 4–5 by the addition of sulfuric acid and was bleached by the addition of 0.908 gram of sodium hydrosulfite per pound of dry clay.

The product recovered by filtration and drying, was then pulverized and was found to have a G.E. brightness of 91.4 and a particle size distribution (expressed in equivalent spherical diameter) of 1% over 5 microns, 85.7% below 2 microns and 70% below 1 micron.

Although little reduction in particle size distribution had occurred, the coating properties of the product were drastically improved. Thus the coated uncalendered sheet made with the product had a gloss of 9.5, a G.E. brightness of 84.6 and a Dennison wax pick on No. 10 wax.

An additional point of importance is that the product from the above treatment had improved rheological properties over that shown by the starting material. Using a Stormer viscometer to determine the viscosity of a 65% solids slurry dispersed to a minimum viscosity by the addition of tetrasodium pyrophosphate, the starting material gave a value of 140 seconds while the product gave a value of 24.8 seconds; this in spite of the well known fact that additional chemical additions to clay slurries tend to impair rheological properties.

The sheets coated with the product and with the starting material, referred to above, were calendered at a pressure of 1800 p.s.i. and the data obtained on the calendered sheets are shown in Table II.

The improved adhesive demand, the higher sheet brightness (note that the difference in gloss and brightness would be even greater if the coatings had been compared at equivalent strengths i.e. wax pick), the marked improvement in opacity and the improved viscosity are of particular importance. The product compares favorably with the top grade of English coating clay (Supreme—see chart and data on the starting material in Example 5).

A similar product may be obtained continuously by use of the apparatus shown in FIGURE 1. A product having a higher percentage of finer particles and/or the continuous removal of traces of discoloring impurities may also be accomplished in the apparatus.

A number of modifications are possible; for instance, the use of plastics other than nylon (e.g. styrene divinylbenzene copolymers, polyethylene, etc.) and of sizes other than the one noted (e.g. 20 mesh down to at least 1/32 inch diameter are satisfactory). Clay-water solids in the range of 30–50%, at least, can be handled. Other commonly used dispersing agents (e.g. Calgon and other condensed alkali metal polyphosphates, alkali metal silicates, etc.) may be substituted for the tetrasodium pyrophosphate. Zinc hydrosulfite or other suitable bleaching agents may be used in place of the sodium hydrosulfite and sulfuric acid may be replaced by other suitable acids such as phosphoric acid. The product can be redispersed and dried in this form, if desired, and other modifications well known to the industry, in handling and shipping clays may be made.

*Example 5*

The procedure given in Example 4 was followed, using the finest available English coating clay (Supreme) as the starting material. This clay had a particle size distribution (equivalent spherical diameter) of 0% over 5 microns, 96.2% below 2 microns and 83% below 1 micron. The G.E. brightness of the starting material was 91.7 and a sheet, uncalendered, coated with the material had a gloss of 13.8, a G.E. brightness of 84.6 and a Dennison wax pick on No. 6 wax.

The product obtained after treatment had markedly improved coating properties, although little particle size reduction had occurred. The G.E. brightness of the product was 93.3 and the particle size distribution was 0% over 5 microns, 97.0% below 2 microns and 83.2% below 1 micron. A sheet coated with the product gave an uncalendered gloss of 15.7, a G.E. brightness of 85.3 and a Dennison wax pick on No. 9 wax. Using a Stormer viscosimeter to determine the viscosity of a 65% solids dispersed slurry (dispersed to minimum viscosity, using tetrasodium pyrophosphate), the starting material gave no check (over 1000 seconds), while the product gave a value of 25.2 seconds.

Data on the calendered sheets are shown in Table II. The marked improvement in opacity is of great importance, as are the improved adhesive demand and the viscosity characteristics. The high gloss and sheet brightness are also of importance.

A similar product may also be obtained continuously by the use of the apparatus shown in FIG. 1.

The starting materials and the products from both examples were calcined for one hour at 1800 degrees F. in an electrically heated Lindberg laboratory furnace. The G.E. brightness and the abrasion of each of the samples are given in Table III.

TABLE II.—ENGLISH COATING CLAYS

| Description | Gloss | Brightness | Opacity | Adhesive Demand, Dennison Wax Pick on Wax No. |
| --- | --- | --- | --- | --- |
| Starting material for Example 4 English Coating Clay (Star Clay) | 42.5 | 80.5 | 93.5 | 7 |
| Product from Example 4 | 60.0 | 81.5 | 96.1 | 8 |
| Starting material for Example 5 English Coating Clay (Supreme Clay) | 63.0 | 81.8 | 94.4 | 6 |
| Product for Example 5 | 66.0 | 82.5 | 96.2 | 8 |

TABLE III.—ENGLISH COATING CLAYS

| Description | G.E. Brightness | Abrasion (mg.) |
| --- | --- | --- |
| Starting material for Example 4 (Star Clay) Calcined | 92.5 | 320 |
| Product from Example 4, calcined | 94.3 | 213 |
| Starting material for Example 5 (Supreme Clay) Calcined | 97.0 | 246 |
| Product from Example 5, calcined | 97.6 | 144 |

The coating comparisons shown in the tables were run under the same standard conditions, using fifteen parts of casein as adhesives to 100 parts of pigment. The sheets were coated by means of an air knife applicator and were calendered at about 1800 p.s.i. The calendered sheet gloss was determined on a Bausch and Lomb glossmeter.

The viscosity measurements were made using a Stormer viscosimeter equipped with the largest spindle and using a 150 gram weight. The clay is dispersed to minimum viscosity (with tetrasodium pyrophosphate) at the indicated solids, and the time in seconds required for 100 revolutions is determined and is used as the measure of viscosity.

The method used in determining the abrasion figures of the above tables was a modification of the method approved by the Institute of Paper Chemistry, but makes use of the same "Valley" apparatus, which is used in carrying out the approved tests. The abrasion index determined by the modified method gives a higher figure than that determined by the method approved by the Institute of Paper Chemistry. The index obtained by that method is about 50% to 60% of the abrasive index, as determined by the modified method used in determining the above figure. The modified method used in determining the above figures was carried out as follows:

This "Valley" apparatus utilizes a tank, and also uses mesh wire cloth which is made of Phosphor bronze, and also uses a "Micarta" block.

The machine is thoroughly cleaned and then flushed with clear water.

The Phosphor bronze woven wire cloth is cut to a test piece of rectangular form, with a length of 8 13/16 inches and a width of 3 7/16 inches. This test piece is washed with soap and water, dried, cooled to 20° C.–30° C. and accurately weighed. Its openings are No. 60 sieve, with openings whose size is 0.250 millimeter or 0.0098 inch. The warp wires of this test piece have a thickness of 0.0092 inch. The filler wires of this test piece have a thickness of 0.010 inch. The total thickness of this test piece of wire mesh is a thickness of about 0.024 inch.

108.5 grams of the clay or other test material whose abrasiveness is to be tested in fine powder form, are mixed with 604.5 grams of water. The mixture of water and fine particles is passed into the tank through a No. 80 sieve, whose sieve opening is 0.177 millimeter or 0.0070 inch, while the valve at the bottom of the tank is closed. The test piece of wire cloth is then clamped into position.

The weighted "Micarta" block is placed in its frame. The block is connected to a driving rod. The frame remains stationary. The weighted "Micarta" block rests on the top of the test piece of wire cloth.

The "Micarta" is a well-known molded material, which is made from fabric or paper which is impregnated with phenol formaldehyde thermosetting resin, and is then compressed under heat in order to set the resin.

According to the standards of the Institute of Paper Chemistry, the weight of this weighted "Micarta" block is 17.2 pounds to 17.5 pounds. This includes the "Micarta" block, and a lead weight. In the tests used herein, the total weight of the "Micarta" weighted block was 18 pounds. This "Micarta" is known as "Canvas Base—Westinghouse No. G-270."

The "Valley" machine is then operated to pump the clay-water slurry or other test aqueous slurry continuously, in a single direction, around the "Micarta" block and the wire cloth, while the "Micarta" block is continuously reciprocated in six thousand complete reciprocations or double strokes. The "Micarta" block thus applied the particles of the test slurry frictionally to the Phosphor bronze wire cloth.

The wire cloth is then removed, washed, dried and weighed. The loss of weight of the wire cloth in milligrams is the abrasion index or value of the respective material. Thus, if the loss of weight of the piece of wire cloth is sixty milligrams, the abrasion value or erosion factor of the tested slurry is designated as "sixty" or as "sixty milligrams."

In this abrasion test, the clay is not usually deflocculated, but it may be deflocculated. The tested material forms a uniform powder mixture with the water during the test.

The calcining of the new products to produce calcined products is carried out by heating the products to a temperature sufficient to drive off the mechanical or hygroscopic water from the clay, as well as the combined water, which is driven off at around 400° to 600° C. and also with further heating to bring about an exothermic reaction which usually takes place at about 721° to 980° C.

In general, the clay product is calcined by heating to a temperature range of 980° C. to 1038° C. This calcining can be carried out in calcining apparatus which is fed continuously and from which the calcined material is continuously discharged with stirring or agitation of the clay during the calcination.

Calcining furnaces such as are used for the calcining of other clay products can thus be used, with proper control of the temperature.

In referring to the particle size distribution of the clay, this is determined by the common sedimentation methods giving results expressed in terms of "equivalent spherical diameter." The figures given are expressed in such terms. This sedimentation method for determining particle size is described in the TAPPI publication T649 sm-54, entitled "Particle Size Distribution of Coating Clay," issued November 1954.

In referring to the gloss of an uncalendered or calendered coated sheet, the gloss was determined on a Bausch and Lomb glossmeter.

A still further improvement in the calcined clay product can be accomplished by subjecting the calcined clay to a delamination treatment by the process and in the apparatus previously described for the treatment of filler and coating coarse clay fractions. Such delamination treatment gives a marked improvement in almost all important properties of the calcined clay, including abrasion, and with a material reduction in the abrasion index of the calcined product, e.g., a 20% reduction, together with a marked improvement in flow properties and in adhesive requirements.

We claim:

1. The method of producing an improved delaminated English primary clay product from English primary filler clays and from English primary coating clays which comprises subjecting such primary clay to delamination by rapid agitation of a slurry of the clay with fine, non-abrasive grinding media, with resulting fine milling mechanical action including (1) a mild, viscous, shear milling due to agitation of the admixed fine milling media, water and clay, (2) a mild percussive milling due to a multiplicity of low inertia impacts for the collisions of the fine milling media with itself and with the clay, and (3) a mild frictional milling by the combination rubbing action of the fine media, and continuing the delamination to produce a fine, delaminated primary clay product.

2. The process according to claim 1 carried out in a batch operation.

3. The process according to claim 1 in which the process is carried out in a continuous manner with continuous feed of the clay slurry and continuous withdrawal of the slurry and separation and removal of the finer clay fraction and return of the coarser clay fraction for further delamination treatment.

4. The method according to claim 1 in which the clay product produced is subjected to calcination to produce a calcined product.

5. The process according to claim 1 in which coarse English primary filler clay is subjected to delamination to produce a fine coating clay product.

6. The process according to claim 1 in which English primary coating clay is subjected to delamination to produce an improved coating clay product.

7. A new delaminated English primary coating clay product made up principally of fine clay platelets produced by delamination of English primary clay, said product being distinguished from conventional English primary coating clays of comparable particle size distribution in the following respects: an uncalendered gloss of coated paper of at least two points higher on the Bausch & Lomb glossmeter, a calendered gloss on coated paper of at least 3 points higher, on the Bausch & Lomb glossmeter, an increased opacity of at least about 2 points, a reduced adhesive demand as measured by the Dennison wax pick test of at least about 2 numbers, a viscosity which is only a fraction of the viscosity of the conventional British primary coating clays and a viscosity comparable with that of conventional domestic coating clays which adapts the product for use on high speed coating machines, and giving, on calcination, a calcined product with a reduction in abrasion index of at least 20%.

8. A calcined, delaminated English primary clay product, which is the calcined product of claim 7.

References Cited in the file of this patent

UNITED STATES PATENTS

| | | |
|---|---|---|
| 2,305,404 | Brown | Dec. 15, 1942 |
| 2,569,680 | Leek | Oct. 2, 1951 |
| 2,581,414 | Hochberg | Jan. 8, 1952 |
| 2,855,156 | Hochberg et al. | Oct. 7, 1958 |